No. 650,016. Patented May 22, 1900.
W. B. MANN.
AIR BRAKE.
(Application filed Aug. 17, 1899.)
(No Model.) 2 Sheets—Sheet 2.

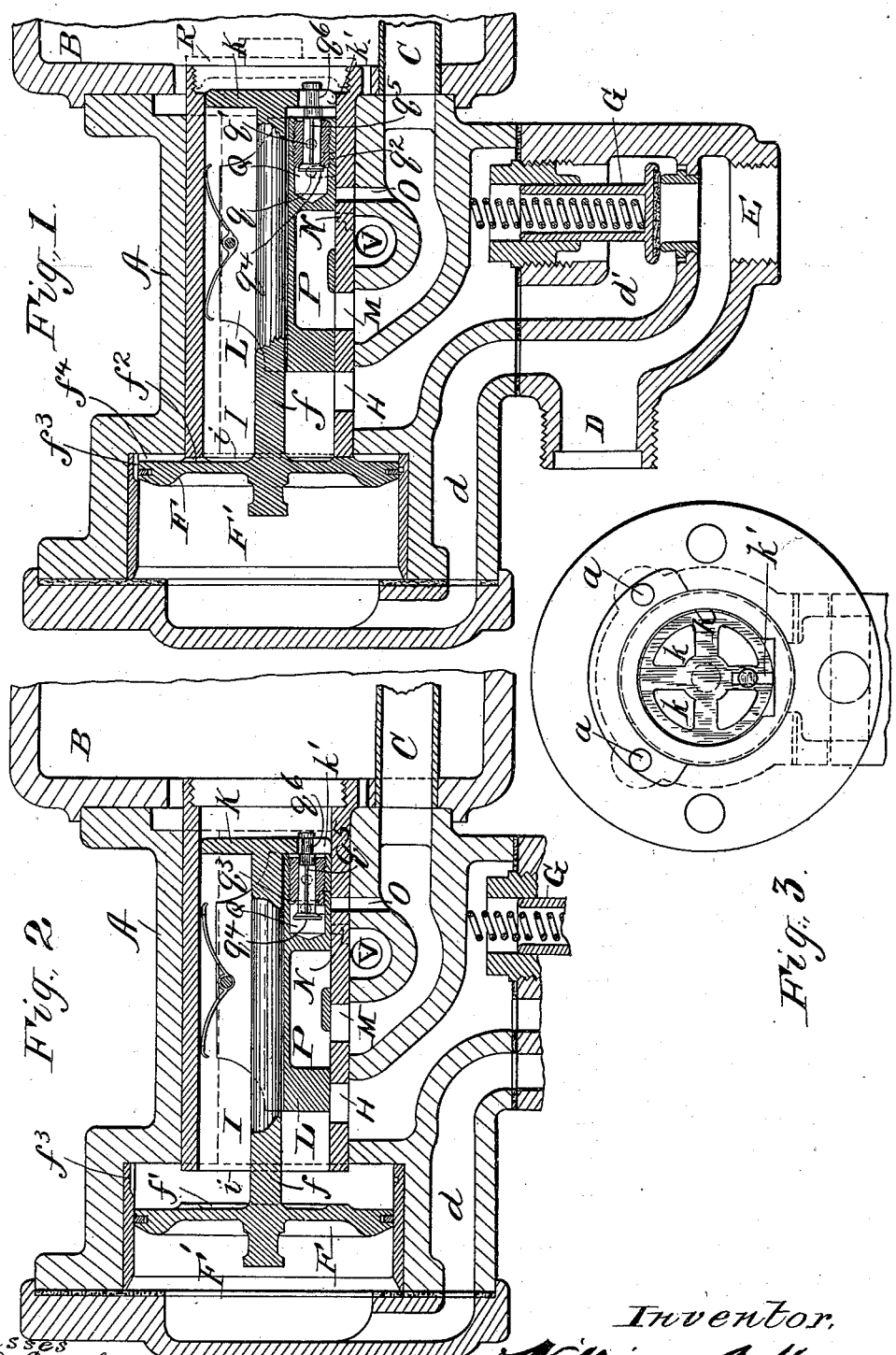

Witnesses.
W. R. Edelen
F. L. Cameron

Inventor:
William B. Mann
by Philip Mauro
his attorneys

THE NORRIS PETERS CO., PHOTO-LITHO., WASHINGTON, D. C.

UNITED STATES PATENT OFFICE.

WILLIAM B. MANN, OF BALTIMORE, MARYLAND.

AIR-BRAKE.

SPECIFICATION forming part of Letters Patent No. 650,016, dated May 22, 1900.

Application filed August 17, 1899. Serial No. 727,549. (No model.)

*To all whom it may concern:*

Be it known that I, WILLIAM B. MANN, a citizen of the United States, residing in the city of Baltimore, State of Maryland, have invented new and useful Improvements in Air-Brakes, which invention is fully set forth in the following specification.

My invention relates to air-brakes for railway-trains, and more particularly to the triple-valve mechanism employed to regulate the passage of the air to and from the brake-cylinder for the application of the brakes.

The object of the invention is to provide a quick-action triple valve which may be promptly and accurately operated to perform all the functions of such valves, yet simple in construction, efficient in operation, and not liable to get out of order.

With this object in view the invention consists in the triple-valve device hereinafter described, and pointed out in the claims.

The inventive idea involved may assume various mechanical forms, one of which I have illustrated in the accompanying drawings, wherein—

Figure 4:
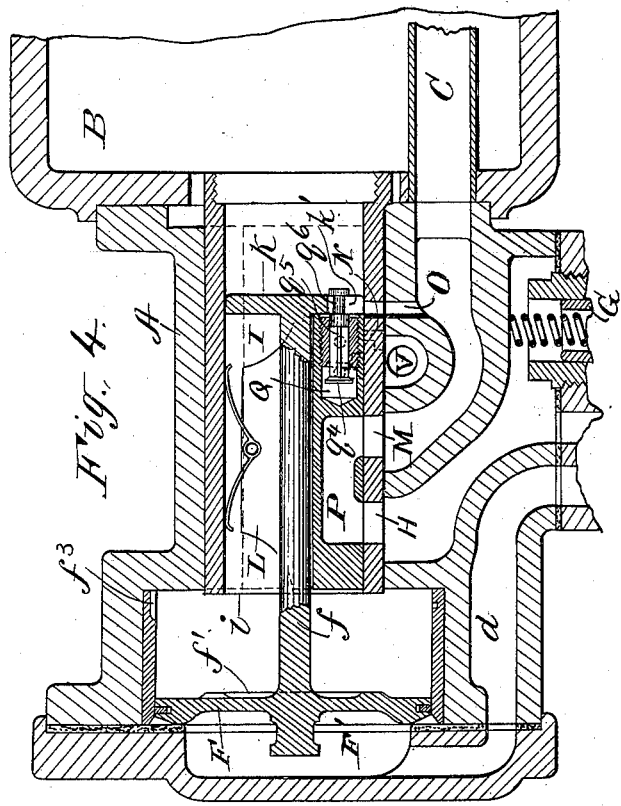
Figure 7:
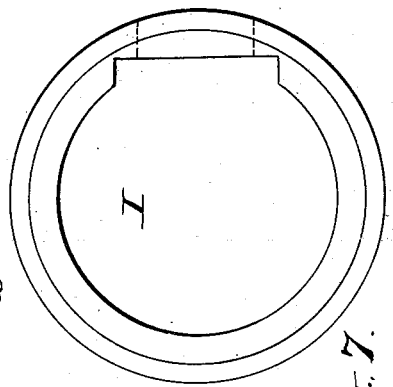
Figure 5:
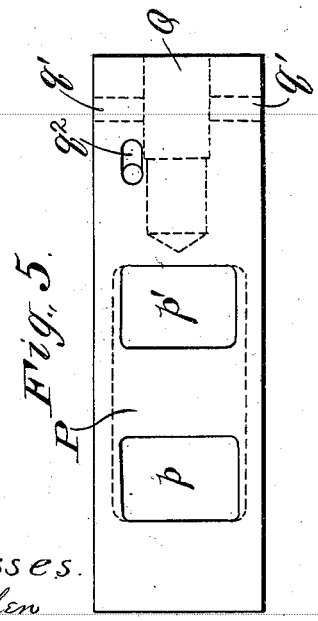
Figure 6:
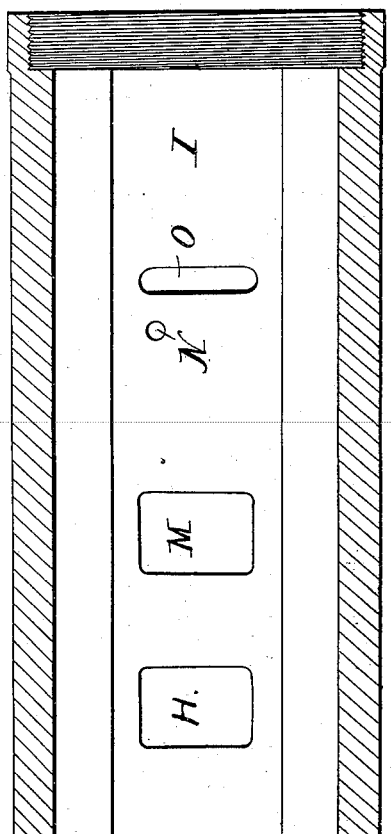

Figure 1 is a longitudinal vertical section of my triple-valve mechanism, parts being shown in elevation and the various valves and the piston in the positions which they occupy when the brakes are released. Fig. 2 is a view similar to Fig. 1 with the parts in the position which they occupy when making a service application of the brakes. Fig. 3 is an end view of Fig. 1 looking from the right with the auxiliary reservoir and pipe leading to the brake-cylinder removed. Fig. 4 is a view similar to Fig. 1 with the parts in the position which they occupy during an emergency application. Fig. 5 is a bottom plan view of the valve-casing, showing the parts in the bottom thereof. Fig. 6 is a longitudinal sectional view of the valve-chamber I; and Fig. 7 is an end view of Fig. 6.

Referring to the figures of the drawings, in which like reference-letters refer to like parts in all the several views, A represents a valve-casing; B, the auxiliary reservoir; C, the pipe leading to the brake-cylinder; D, the passage leading to the train-pipe, and E a place for attaching the usual drip-cup.

$d$ is a passage leading from the train-pipe to the exterior or train-pipe side of the piston F, and $d'$ is a passage leading past the check-valve G and through the port H to the valve-chamber I upon the auxiliary-reservoir side of the piston F, said chamber being in free and unobstructed communication with the auxiliary reservoir through the openings $k$ (see Fig. 3) in the head K on the opposite end of the piston-stem $f$ from the piston F.

L is the main valve, situated in the valve-chamber I and controlling the ports H, leading to the train-pipe, M, leading to the brake-cylinder, N, leading to the vent V, which is in communication with the atmosphere, and also the port O, leading from the valve-chamber to the brake-cylinder. The main valve L has formed in the body thereof a large duct or passage P, having ports $p\,p'$ opening to the base of the valve, said ports being so spaced as to exactly register with ports H M when the valve is in emergency position, (shown in Fig. 4,) the length of the valve L being such that in this position the port O is fully uncovered. A second duct or passage Q is formed in the body of the valve L, which duct or passage communicates with the valve-chamber through the port $q'$ and with the face of the valve through the port $q$ and oblong port $q^2$. Between the ports $q\,q'$ there is a valve-seat $q^3$, and when the valve is in charging position there is seated thereon a valve $q^4$, having a winged valve-stem $q^5$ extending outward through the end of the main valve L and operatively connected to the head K by means of the reduced neck portion $q^6$ on the valve-stem engaging with the slot $k'$ in the head K, as will readily be understood by inspection of Fig. 3. There is a certain amount of lost motion between the valve L and the head K on the piston-stem $f$, so that before the head K contacts with the valve L to move the same the valve $q^4$ in unseated, thereby opening communication between the ports $q'$ and $q$.

On the auxiliary-reservoir side of the piston F there is formed a slightly-raised annular flange $f'$, which is ground, so as to make a close joint with the projecting end $i$ of the bushing in the valve-chamber I, said flange and bushing being of same diameter.

$f^2$ is a small duct or passage cut across the flange $f'$, whereby when the piston is in the position shown in Fig. 1 and the flange $f'$ seated against the projecting end $i$ of the bushing air may pass through the passage $f^2$. The usual feed duct or passage $f^3$ is formed in the wall of the piston-cylinder F', whereby when the piston F is in release or charging position air may pass from the train-pipe side of the piston F to the auxiliary-reservoir side; but when the piston F is shifted slightly to the left the passage of air through said duct is cut off in a manner which will be readily understood.

The operation of the device as thus far described is as follows:

*Charging auxiliary reservoir.*—Air being permitted by the engineer to pass from the main reservoir into the train-pipe, it enters the passages $d$ and $d'$, but in order to enter the latter has to overcome the tension of the spring controlling the check-valve G, so that the movement of the air through the passage $d$ is more rapid than through $d'$. The result of this is that the air-pressure on the train-pipe side of the piston F is obtained slightly in advance of that on the auxiliary-reservoir side of said piston, and the parts are therefore instantly thrown to release position, (shown in Fig. 1,) whereby the brake-cylinder is placed in communication with the atmosphere through ports M $p$, duct P, ports $p'$ N, and vent V. At the same time air is rapidly passed in large quantities past the check-valve G, through the passage $d'$, port H, valve-chamber I, and openings $k$ into the auxiliary reservoir B. A comparatively-small amount of air also passes in through the feed-ducts $f^3$ $f^2$. The only connection between the piston and the valve L being through the piston-head K and valve-stem $q^5$ of the valve $q^4$, said valve is firmly seated in the act of moving the parts to release position, thereby closing communication between the ports $q$ $q'$ and moving the port $q^2$ out of register with the brake-cylinder port O.

*Service application of the brakes.*—The auxiliary reservoir being charged, a slight reduction of train-pipe pressure below that contained in the auxiliary reservoir causes the piston F to make a partial traverse of its cylinder F' to the position shown in Fig. 2. The pressure on the train-pipe side of the valve G being less than that on the auxiliary-reservoir side, the same is firmly held to its seat by the combined action of its spring and the air-pressure, and the piston F having shifted past the feed-duct $f^3$ the auxiliary reservoir is entirely shut off from the train-pipe, and communication between the brake-cylinder and the atmosphere is also closed, as will be understood by inspecting Fig. 2. In this position, however, the valve $q^4$ is unseated and the port $q^2$ is immediately over the port O, leading to the brake-cylinder, and air therefore passes from the auxiliary reservoir into the valve-chamber and through the port $q'$, duct Q, ports $q$, $q^2$, and O to the brake-cylinder until the pressure on the auxiliary-reservoir side of the piston F has fallen to a point very slightly below that on the train-pipe side thereof, when the piston F will slightly shift to the right, seating the valve $q^4$, but without moving the valve L. In this position communication between the auxiliary reservoir and the train-pipe remains closed, and a very slight reduction in train-pipe pressure will again cause the piston F to shift to the left and reopen the valve $q^4$, whereby the additional amount of air-pressure is permitted to pass from the auxiliary reservoir to the brake-cylinder. This operation may, if desired, be repeated until the pressure in the auxiliary reservoir and the brake-cylinder has become equalized.

*Emergency application.*—When it is desired to secure the emergency application of the brakes, a large and sudden reduction in train-pipe pressure is initiated by the engineer through the engineer's valve, thereby causing the piston F to make its full traverse from any position in which it may at the moment occupy to the position shown in Fig. 4. While the valve L is shifting to this position and before the valve is moved far enough to uncover the port O, communication is opened from the train-pipe to the brake-cylinder through the port H, duct P, and port M, whereby the train-pipe is suddenly vented into the brake-cylinder in advance of auxiliary-reservoir pressure entering through the port O, and upon the valve P reaching the position shown in Fig. 4, uncovering port O, the train-pipe remains in unobstructed communication with the brake-cylinder until such time as the pressure in the latter equals that of train-pipe pressure, when the back pressure from the brake-cylinder, acting in conjunction with the spring, closes the check-valve G. By this means the passage of air from the train-pipe to the brake-cylinder in order to secure that quick venting of the pipe upon which quick serial action depends is not checked by the inrush of air from the auxiliary reservoir to the brake-cylinder, the train-pipe being vented to a degree sufficient to secure quick serial action before any substantial pressure has entered the brake-cylinder from the auxiliary reservoir. Should it be desired to release the brakes when the parts are either in the position shown in Fig. 2 or Fig. 4, it may be quickly accomplished by restoring train-pipe pressure through the engineer's valve, when the parts will instantly shift to the position shown in Fig. 1 and the auxiliary reservoir will be instantly charged through the passage $d'$, port H, valve-chamber I, and the openings $k$ in the head K. Heretofore an appreciable amount of time has been consumed in charging or recharging the auxiliary reservoir because of the amount of time required for the necessary pressure to pass through the feed-duct $f^3$ on its way from the train-pipe to the auxiliary reservoir. The construction whereby the auxiliary reservoir can be instantly recharged to its maximum pressure is of the utmost importance, as it enables the engineer when going down long grades to recharge his depleted reservoir before his train can gain such momentum as to get beyond his control, thereby rendering the use of retaining-valves unnecessary. If it is desired for any reason to have the auxiliary reservoir charged more gradually, I may, instead of having the air pass through the valve-chamber I directly to the auxiliary reservoir through the openings $k$ in the head K, close that end of the valve-chamber adjoining such head K in any suitable manner—for example, by the screw-cap R shown in dotted lines in Fig. 1—and permit the air to pass to the auxiliary reservoir by way of ducts $f^2 f^3$ to the annular chamber $f^4$, situated between the piston F and the main valve-casing A, said annular chamber $f^4$ being connected directly with the auxiliary reservoir by longitudinal passages $a$, formed, preferably, in the body of the casing A and extending from the annular chamber $f^4$ to the auxiliary reservoir. (See dotted lines in Fig. 1 and full lines in Fig. 3.) It is apparent that with this construction air will not pass from the train-pipe to the auxiliary reservoir with the same rapidity as when entering directly through valve-chamber I and the openings $k$ in the head K, as the piston F holds the flange $f'$ firmly seated upon the projecting rim $i$ of the valve-chamber lining I; but when the piston F is shifted to the left, either in service or emergency applications, unobstructed passage of air from the auxiliary reservoir through the passages $a$, the annular chamber $f^4$, and the valve-chamber I is permitted.

Having thus described my invention, I claim—

1. In a triple valve, the combination of the train-pipe, auxiliary reservoir and brake-cylinder, with a main slide-valve which alone controls the venting of the train-pipe and the passage of auxiliary-reservoir air to the brake-cylinder for emergency applications and the release of air from the brake-cylinder, a graduating-valve controlling the passage of auxiliary-reservoir air through the main valve for service applications, and an imperforate valve-operating piston connected to the main valve by said graduating-valve.

2. In a triple valve, the combination of a main valve which alone controls quick venting of the train-pipe and quick equalization of auxiliary-reservoir and brake-cylinder pressures for emergency applications and the quick charging of the auxiliary reservoir and the release of the brakes, with a graduating-valve controlling the passage of air through the main valve for service applications and an operating-piston connected to said graduating-valve and having a shoulder on its stem which shoulder abuts against the main valve only when moving to service or emergency positions.

3. The combination of the main slide-valve which alone controls the venting of the train-pipe and the passage of auxiliary-reservoir air to the brake-cylinder for emergency applications and the release of air from the brake-cylinder, with a graduating-valve seating on a valve-seat in a chamber in the main valve having a stem projecting outward from said chamber, an operating-piston connected to said projecting stem, and having a part with a shoulder abutting said main valve, whereby said main valve is pushed to service or emergency positions by said shoulder and is pulled to release position by said graduating-valve.

In testimony whereof I have signed this specification in the presence of two subscribing witnesses.

WILLIAM B. MANN.

Witnesses:
PHILIP MAURO,
EDOUARD C. PANITZ.